Feb. 21, 1961  C. ANDREW  2,972,184
MACHINE FOR MOUNTING SPOUTS IN THE TOPS OF CONTAINERS
Filed Nov. 29, 1957  6 Sheets-Sheet 1

INVENTOR
CHARLES ANDREW
HIS ATTORNEYS

Feb. 21, 1961

C. ANDREW 2,972,184

MACHINE FOR MOUNTING SPOUTS IN THE TOPS OF CONTAINERS

Filed Nov. 29, 1957

INVENTOR.
CHARLES ANDREW
BY
HIS ATTORNEYS

Feb. 21, 1961 — C. ANDREW — 2,972,184
MACHINE FOR MOUNTING SPOUTS IN THE TOPS OF CONTAINERS
Filed Nov. 29, 1957 — 6 Sheets-Sheet 3

*INVENTOR.*
CHARLES ANDREW
BY
HIS ATTORNEYS

INVENTOR.
CHARLES ANDREW
HIS ATTORNEYS

Feb. 21, 1961 C. ANDREW 2,972,184
MACHINE FOR MOUNTING SPOUTS IN THE TOPS OF CONTAINERS
Filed Nov. 29, 1957 6 Sheets-Sheet 5

*INVENTOR.*
CHARLES ANDREW
BY
HIS *ATTORNEYS*

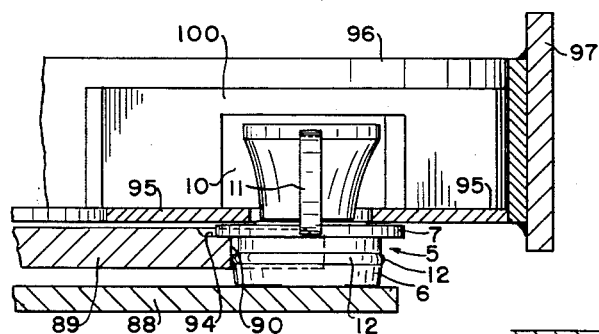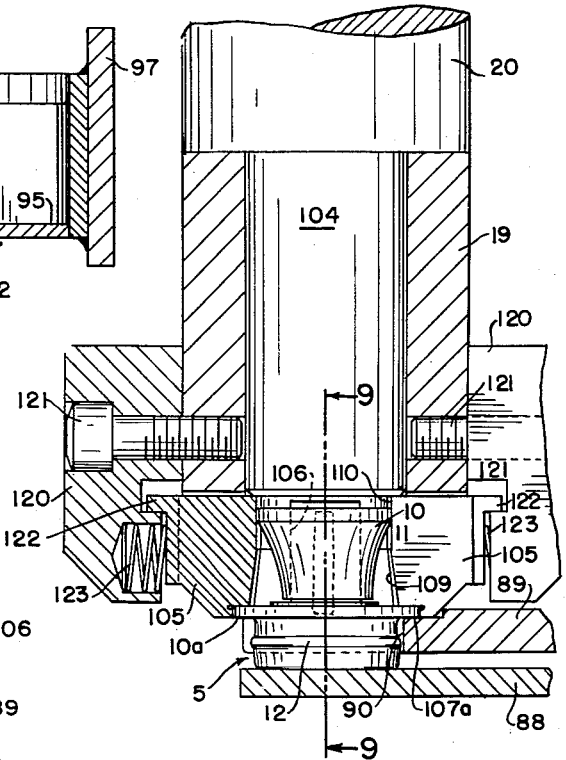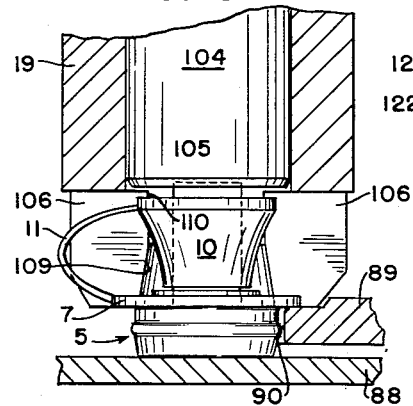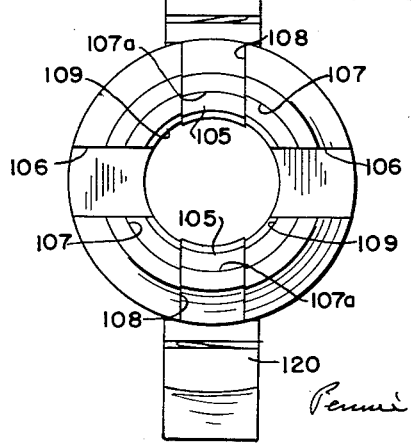

United States Patent Office 2,972,184
Patented Feb. 21, 1961

2,972,184

MACHINE FOR MOUNTING SPOUTS IN THE TOPS OF CONTAINERS

Charles Andrew, Brooklyn, N.Y., assignor to Andrew & Waitkens Machine Co. Inc., New York, N.Y., a corporation of New York Filed Nov. 29, 1957, Ser. No. 699,702

9 Claims. (Cl. 29—208)

This invention relates to machines for mounting nozzles or spouts in the tops or caps of containers. More particularly, the invention relates to automatic machinery for inserting or applying nozzle or spout members which are elastic in the nature of the molded polyethylene, rubber or the like, in or to apertures provided in the tops, caps or heads of cans or the like.

The object of the invention is to provide an apparatus to which the nozzle or spout members can be fed en masse, and to which the cans are fed in a continuous line, and which will operate automatically to mount the nozzle or spout members in apertures provided one in each can top.

The apparatus of the invention is used in line with container-filling apparatus and also with container packaging apparatus, the contents being filled through the apertures in the tops or heads of the cans prior to being fed into the present apparatus. Both the filling apparatus and the packaging machinery operate at a comparatively high rate of production and it is an object of my present invention to provide apparatus for applying the spout members to the containers which will not lower the production rate of the apparatus with which it is used.

In packaging certain household products such, for example, as liquid detergents, the liquid is placed in a container such as a cylindrical can having a metallic top, cap or head in which there is a central aperture, and mounted in this aperture is the spout member by which the contents of the can are dispensed to the laundry tub, dish pan or the like. This member is molded of polyethylene, or some material which is elastic in the nature of polyethylene, rubber or the like.

The spout member is frictionally mounted and held in the aperture in the head of the can and is provided with a discharge passage of appropriate size depending upon the nature of the contents of the container. The nozzle portion of the spout member is closed by a cap of the same material which frictionally fits the nozzle and which is permanently connected or attached to the body of the spout member by a narrow strip of the same material of which the spout member is molded. When the cap is in closed position this connection between the cap and the body of the spout member projects outwardly in a curve and renders the device non-symmetrical.

In the trade such spouts are referred to as "captive plugs," meaning that while the cap can be removed from the nozzle it is always attached to the spout member and cannot be lost or mislaid.

In accordance with my present invention I have provided means for receiving these spout members in a helter-skelter mass and continuously rearranging them so that the tops of the spouts all face in a given direction and so that the projections or connecting portions (sometimes referred to as "handles") face in either of two directions, the spout members thus rearranged being fed forward in a continuous line, and means are provided for successively removing the spout members from this line, keeping the projections facing in the same direction in which they have been rearranged, and successively mounting them in the tops of the cans or the containers, such cans also being fed successively into axial alignment with the respective spout members. Advantageously, the feeding means turns the spout members into upright position and the cans are also fed in upright position, inasmuch as the cans have previously been filled.

The invention will be better understood by considering the accompanying drawings showing one embodiment thereof, together with the description following.

In these drawings:

Fig. 1a is a view in elevation of a spout member with the captive cap removed from its nozzle and showing the spout member mounted in the aperture in the head of a can, the upper portion of the can being shown in central section;

Fig. 1b is a view similar to Fig. 1, but with the cap in closed position;

Fig. 3a is a detailed vertical section taken on line 3a—3a of Fig. 3.

Fig. 7 is a detailed vertical section taken on line 7—7 of Fig. 4;

Fig. 8 is a similar section taken on line 8—8 of Fig. 4;

Fig. 9 is a similar section taken on line 9—9 of Fig. 8; and

Fig. 10 is a bottom view of the chuck.

Figure 1:
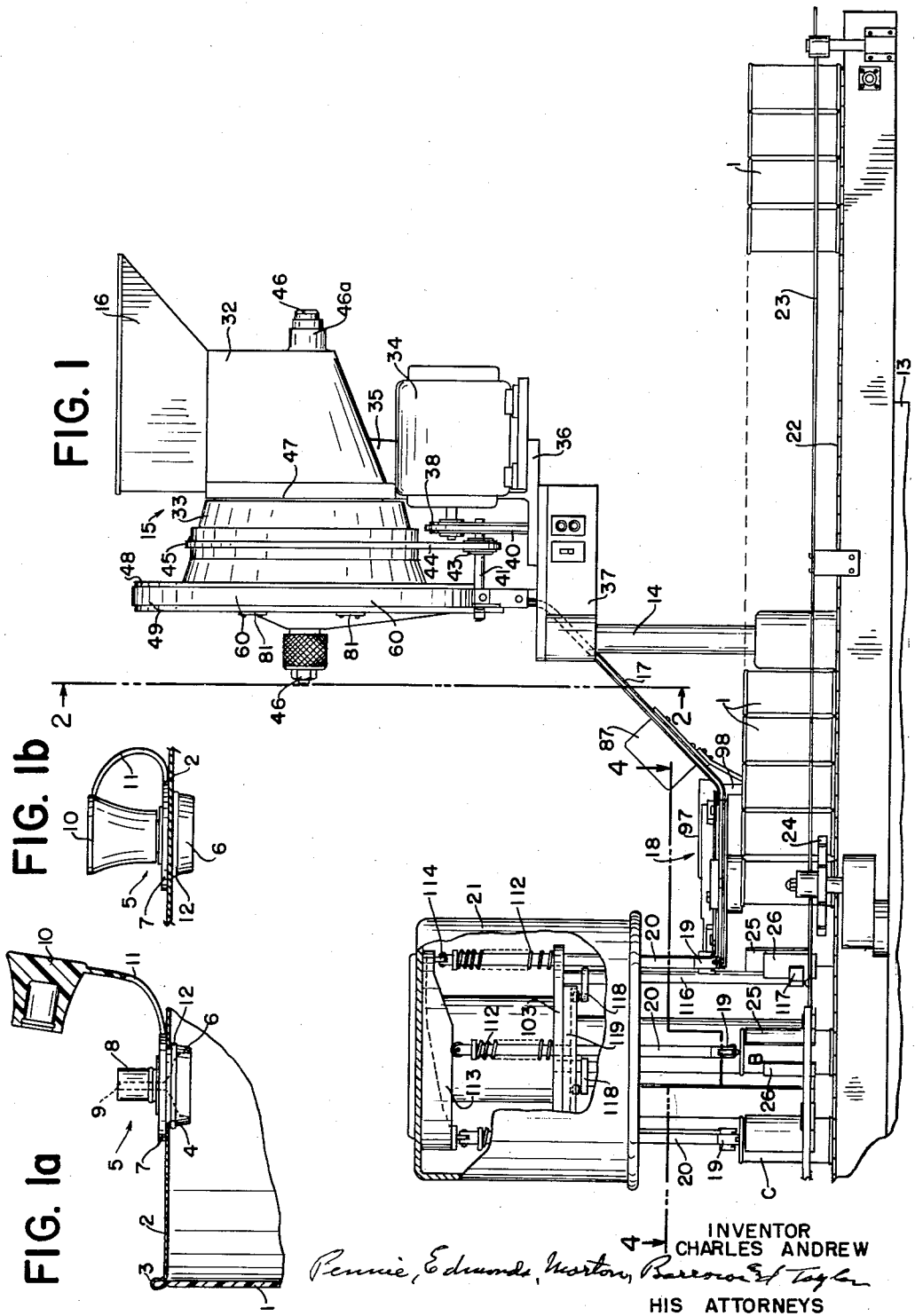
Fig. 1 is a view in elevation of the apparatus as a whole.

The construction of the spout member and manner of its mounting in the head of the can is shown in Figs. 1a and 1b. The can 1 has a cylindrical body to which a head 2 is attached by means of the usual bead 3 or otherwise. The bottom or base of the container is similarly attached, but is not shown. The base and head or top portions are of sheet metal and although the body portion 1 may be of the same material the can under consideration is of the squeeze type, and hence the body portion 1 is made of a flexible material, for example, such as is used for making plastic bottles, the present can being used as a container for a liquid detergent.

In the head 2 there is provided a central circular aperture 4 and the spout member, designated generally as 5, is mounted in this aperture. The spout member comprises a cylindrical body portion having a flange 7 to seat on top of the can head and above this flange a cylindrical nozzle portion 8 of a smaller diameter. The nozzle has a small aperture 9 therein somewhat less than one-thirty-second of an inch in diameter. A cap 10 is recessed to fit over nozzle 8 and closes the aperture 9. Cap 10 is permanently attached to the nozzle by means of a connection 11 which joins the upper portion of the cap with flange 7.

Nozzle 5 is made of molded plastic such as polyethylene or a material which is elastic in the nature of polyethylene, rubber or the like. The cap 10 and connection 11 are molded simultaneously with the remaining portion of the spout member, connection 11 being a thin narrow ribbon which is readily flexible to allow the application of the cap to the nozzle. When the cap is in closed position the connection 11 projects laterally from the spout member in a sweeping curve, being referred to as the "handle," and renders the spout member unsymmetrical.

In order that spout 5 may be securely mounted in the aperture 4 and in such a manner as to provide a liquid-tight joint therewith, the diameter of the body portion 6 of the spout is made to correspond with the diameter of aperture 4 and flange 7 is set in tight relationship with the upper surface of head 2 surrounding aperture 4. This is accomplished by molding a small, external bead 12 on body portion 6 at a distance below the flange 7 and corresponding to the thickness of head 2.

Because of the elastic nature of polyethylene, the spout member may be mounted in aperture 4 merely by applying suitable pressure to the top of cap 10 with the cap in closed position, as shown in Fig. 1b. Such pressure forces bead 12 which is somewhat larger in diameter than aperture 4 to contract sufficiently to permit it to squeeze through the aperture and then expand into contact with the lower surface of head 2 around the perimeter of the aperture.

Figure 2:
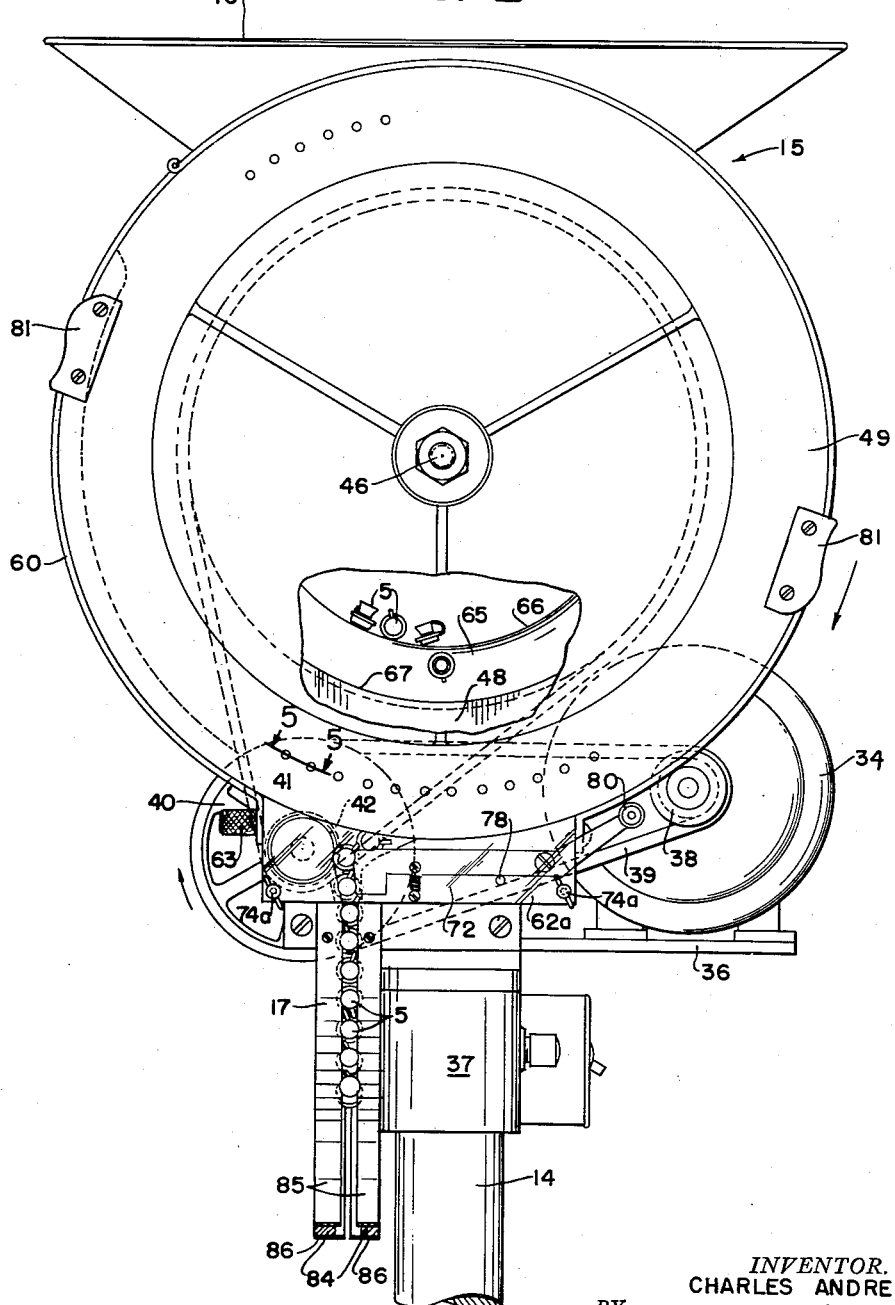
Fig. 2 is a view, partly in elevation and partly in section, taken on line 2—2 of Fig. 1 and looking in the direction of the arrows.
Figure 3:
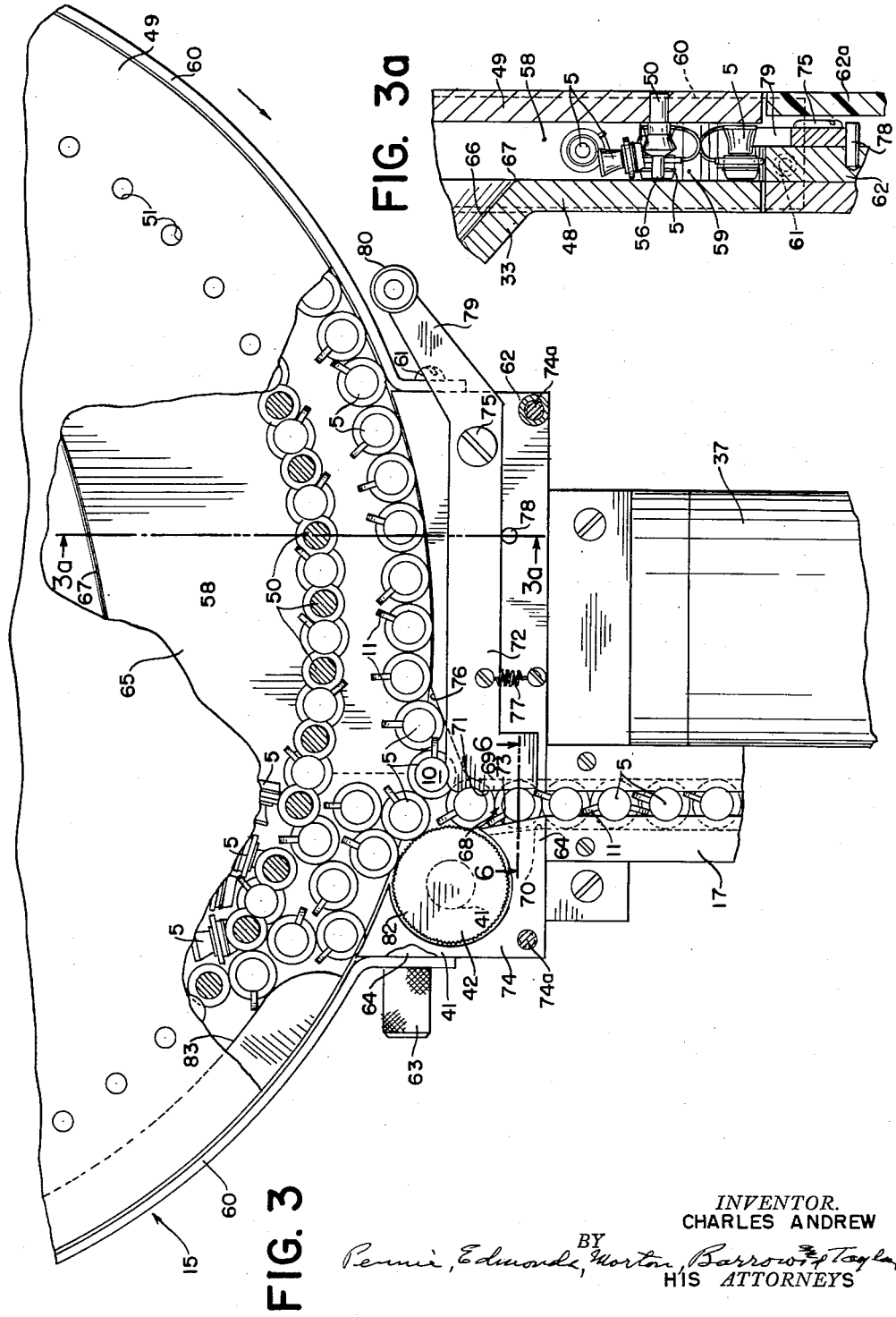
Fig. 3 is an enlarged view of some of the mechanism shown in Fig. 2, with the outer member broken away so as to show the interior.

Referring now to Figs. 1–3 the apparatus has a frame 13 of any suitable construction which supports it at a convenient distance from the floor. Above this frame and suported by a column 14 projecting therefrom there is a spout rearranging mechanism indicated generally by numeral 15 which is provided with a hopper 16 into which the spout members are thrown in a helter-skelter mass. Mechanism 15 rearranges the spout members so that they are discharged at the bottom into a downwardly and angularly inclined feed chute 17 with the tops of the spouts all facing outwardly, that is, to the left in Fig. 1, and also with the projecting connections or handles 11 facing generally in either of two directions, that is, upwardly or downwardly (Figs. 2 and 3).

Chute 17 curves into a horizontal position at its lower end and delivers the continuous line of spout members 5 to a rotary mechanism indicated generally by numeral 18 which removes the spout members successively one at a time from the lower end of chute 17 and moves them into vertical alignment beneath one of a series of vertically reciprocating chucks 19, there being four of these chucks. Three of these are visible in Fig. 1 and the fourth is diametrically opposite the middle chuck. Chucks 19 are mounted on the lower ends of four plungers 20 which project downwardly from a cylindrical housing 21 containing mechanism by which the plungers are moved vertically upwardly and downwardly and at the same time are rotated bodily about the centre of a carrier within this housing.

The cans or containers 1 coming from the filling machine where they have been filled with the liquid detergent or other contents through their apertures 4, are moved into the apparatus of the present invention on an endless conveyor 22, between fixed guides 23 to maintain the cans in a continuous line on the conveyor. A star wheel timing device 24 is provided at the left of endless conveyor 22 to separate the cans and feed them one at a time to a series of four pairs of pocket-forming members 25, 26 (Figs. 1 and 4), member 25 of each pair being fixed and member 26 of each pair pivoted.

These pairs of pocket-forming members 25, 26 are arranged one pair vertically beneath each of the four plungers 20 and they rotate with these plungers, both pocket members and plungers being mounted on a common rotary head in a manner to be described later on. As each spout member 5 arrives at the point of tangency between the circular path of plungers 20 and the rotary mechanism 18 (Fig. 4), one of the plungers 20 lowers its chuck member 19 which picks up the spout member by frictional engagement therewith, as will be described. The continued rotation of the rotary head moves the pair of pocket-forming members 25, 26 which are beneath this plunger and chuck in a clockwise direction (Fig. 4), and before the fixed pocket member 25 of this pair moves into the path of conveyor 22 a can, such as the can A in Fig. 4 has been released by the star wheel timer 24 and carried forward by the endless belt so as to be in front of this fixed pocket member 25 by which it is swept from the belt.

Figure 4:
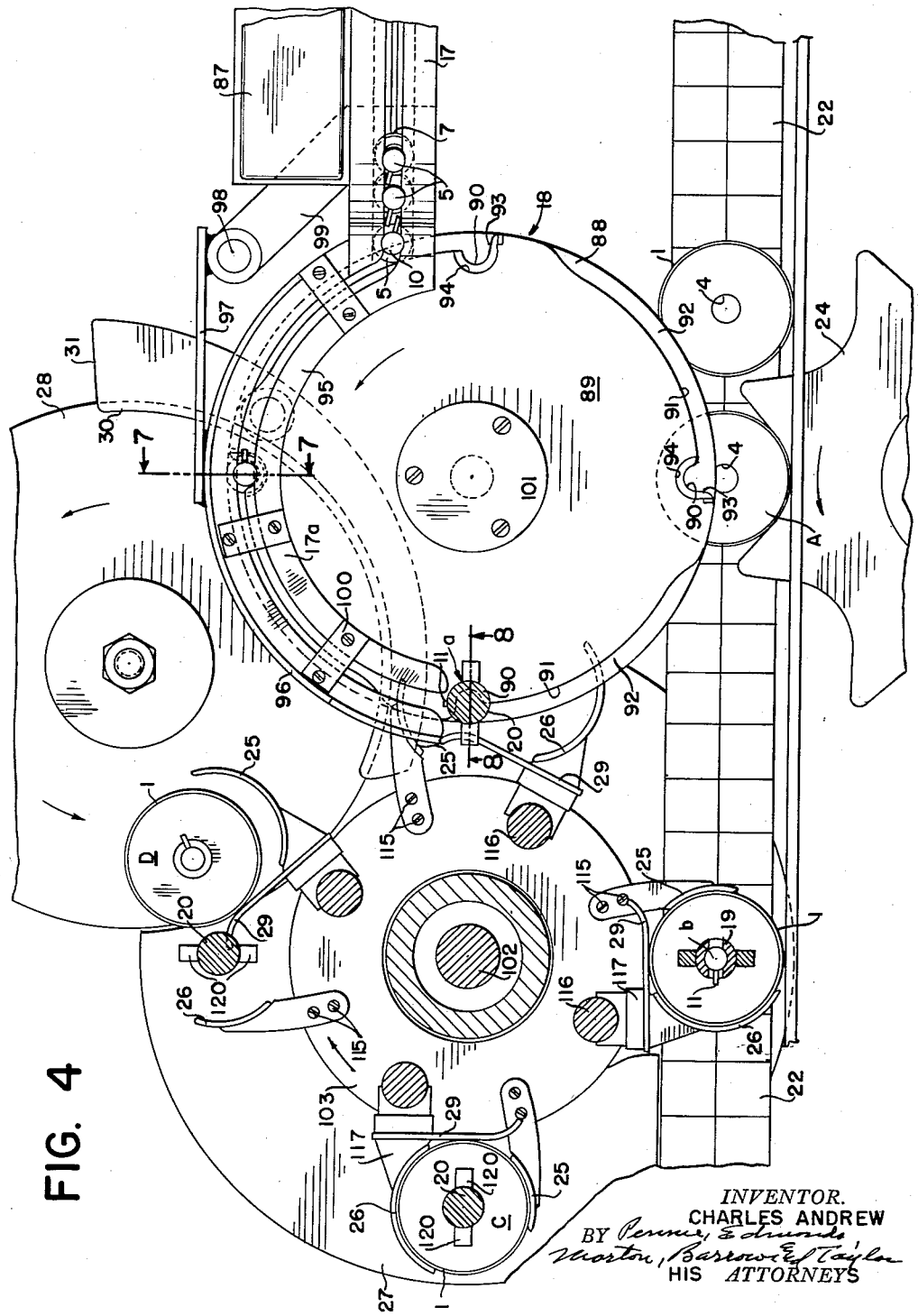
Fig. 4 is a view in horizontal section taken on line 4—4 of Fig. 1, and drawn to an enlarged scale.

As the rotation of the pairs of pocket members continues, the pivoted pocket member 26 of the pair under consideration will have closed upon can A, the can at position B shows the two pocket members engaging the opposite sides of the can. In other words, as the cans come forward on the endless belt 22 under the control of the star wheel 24 the successive fixed pocket members 25 sweep them from belt 22 and onto the surface of a semi-circular fixed supporting plate 27 (Fig. 4).

The spout member has now been advanced from the position a, the point of tangency referred to, to the position b where it is in vertical alignment with and above the aperture in the can at position B. The can and cap members are then moved bodily in a circular path to the can position C which is diametrically opposite the spout position a. At can position C, the plunger 20 is moved downwardly and forces the spout member into the aperture in the can head.

Thereafter, upon the continued rotation of the pairs of pocket members 25, 26 the can with the spout applied to its head is discharged, as shown at can position D onto a continuously rotating flat discharge disc 28. Such discharge movement onto disc 28 is effected by means of a vertically positioned plate 29 having a rounded outer end, one of which is fixed to the support for each of the movable pocket members 25. Consequently, as the pocket member 25 at can position D swings to open position, member 29 engages the side of the can and pushes it onto disc 28. A semi-circular guide 30 disposed above disc 28 prevents it from leaving the disc until it passes the end 31 of this guide at which point the cans are successively received on a discharge conveyor or other support.

Referring now to the rearranging mechanism 15, shown in Figs. 1, 2 and 3, this mechanism comprises the hopper 16, a stationary hollow body portion 32 and a hollow rotary drum or receptacle 33, together with a driving motor 34. Body 32 with hopper 16 are supported by vertical member 35 which terminates at the bottom in a foot 36 bolted to a bracket 37 which is mounted upon the upper end of column 14. Driving motor 34 is bolted to an extension of foot member 36 and has a driving pulley 38 which by means of an endless belt 39 drives a larger pulley 40 which is arranged on a short shaft 41 suitably journalled in bearings supported by parts which are mounted on brackets 37.

On the forward end of shaft 41 there is mounted a narrow cylinder or roller 42 having a roughened or knurled face and which aids in feeding the spout members toward the feed chute 17, as will be described later on. On the inner portion of shaft 41 near pulley 40, there is a small pulley 43, and an endless belt 44 is trained around this pulley and a cylindrical surface 45 formed on rotatable portion or drum 33 of the rearranging mechanism. Thus both roller 42 and the rotating drum 33 are continuously driven by means of electric motor 34.

The rotary drum 33 has a shaft 46 which rotates in bearings, one of which is shown at 46a. The second bearing (not shown) is mounted within the stationary body portion 32 of the rearranging mechanism.

Figure 5:
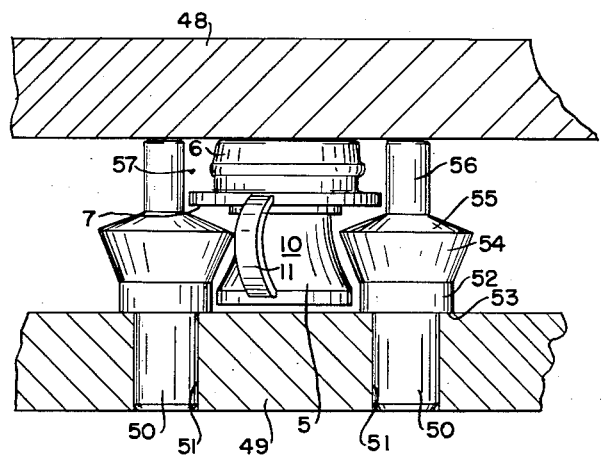
Fig. 5 is a greatly enlarged detailed section taken on line 5—5 of Fig. 2.

The outer or left-hand face of rotary drum or receptacle 33, as viewed in Fig. 1, terminates in a vertical flange 48 of considerably larger diameter than drum 33 (Fig. 2). Supported in parallel relation to flange 48 there is a circular disc or plate 49 which is spaced outwardly from the face of flange 48 by a distance which is slightly greater than the height of the spouts 5, as shown in Fig. 5. Spaced inwardly from the edge of plate 49 there is a circular row of uniformly spaced control members or pins 50, these members having outwardly positioned cylindrical shanks which are mounted in apertures 51 in plate 49.

These control members are all of the same shape and each has a short cylindrical portion 52 (Fig. 5) somewhat larger than the cylindrical shank so as to form a shoulder 53 which is positioned against the inner surface of plate 49. Extending inwardly from cylindrical portion 52 there is a portion 54 having the shape of a truncated cone having its smaller diameter at the inner end of the cylindrical portion 52.

Extending inwardly from the larger diameter of truncated conical portion 54 there is a second truncated conical portion 55 reversely positioned with respect to portion 54 and having its smaller diameter joined to an inwardly extending cylindrical portion 56 which is smaller in diameter than the outer cylindrical portion of the pin. While the inner ends of cylindrical portions 56 may touch the outer surface of flange 48, they are preferably spaced slightly therefrom.

Because of the particular shape of the control members or pins 50, just described, there is formed between each pair of these members a space 57 the geometrical outline of which is such that a spout member 5 can pass through this space only if the cap 10 thereof faces outwardly, that is, towards plate 49 (Fig. 5).

The radial position of the circular row of control members 50 is such as to leave a space both above and below such row. These spaces are designated respectively as 58 and 59 (Figs. 3 and 3a). The cap members 5 are in helter-skelter arrangement in the upper space 58, and as the flange 48 and spaced plate 49 rotate, the spouts tumble about in the upper space 58 until they are rearranged with their caps facing outwardly and then they pass through these spaces 57 between the various adjacent pairs of the control members 50 into the lower space 59.

In order to close the slot-like opening extending around the flange 48 and circular plate 49, a stationary steel band 60 is provided. This band is supported at its right end by means of a screw 61 on the right face of a stationary member 62 which is fixed to the upper end of bracket 37. At its left end, band 60 is similarly supported by means of a knurled thumb screw 63 which is threaded into a member 64 also mounted upon the upper part of bracket 37 and in line with member 62. The upper surfaces of members 62 and 64 are curved to conform to the curvature of the edges of flange 48 and circular plate 49.

The spout members which have passed the control members 50 into the lower space 59 and are, consequently, arranged with their caps facing outwardly are supported upon the curved upper surface of members 62 and 64, and the surface of roller 42 as well as the right hand portion of band 60 adjacent member 62 (Figs. 3 and 3a). The spout members may arrange themselves in a continuous row extending from the right along these surfaces towards the discharge opening or slot which will be described presently. Their projection or handle portions 11 may extend in any direction and have to be aligned so as to project either upwardly or downwardly in order to pass through the discharge slot.

The general shape of rotary portion 33 of the rearranging mechanism is in the form of a portion of a cone, as shown in Fig. 1, and the interior surface of this member follows this general formation. Accordingly, the inner surface 65 of this member, a portion of which may be seen in Fig. 2, slopes on its lower side from the diameter 66 of its inner edge to the diameter 67 which is the intersection with flange 48. Consequently, the spout members which are placed en masse in the hopper 16 and descend into its body portion 32 flow downwardly along the inclined bottom surface of this portion and are received on sloping surface 65 (Fig. 3) and carried thereby into the upper space 58 (Fig. 3a) whence they are rearranged by the control members 50, as previously described, and then pass into the lower space 59.

Figure 6:
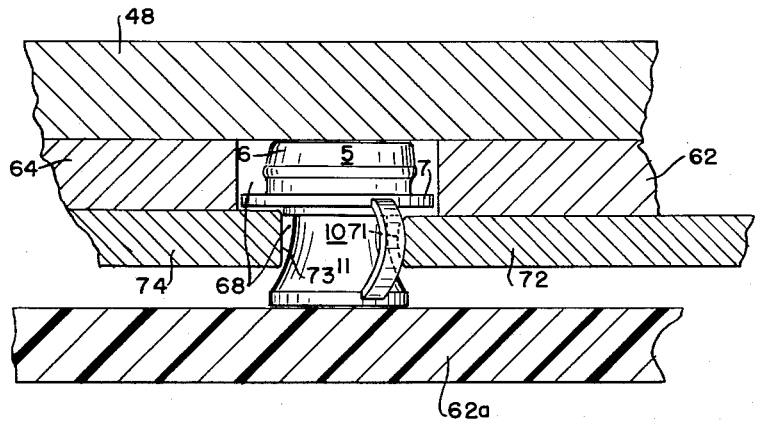
Fig. 6 is a view similar to Fig. 5, taken on line 6—6 of Fig. 3.

The discharge slot referred to above is a vertical passageway designated by numeral 68 (Figs. 3 and 6) and the spouts move now from space 59 through this opening into the upper end of feed chute 17. The front portion of this discharge opening is narrower than the rear portion, the front portion being just wide enough to accommodate the width of the caps 10 of the spout members, whereas the rear portion accommodates the diameter of the flanges 7 of the spout members and the depth of such rear portion is somewhat greater than the distance from the upper face of flange 7 to the inner end of the spout member. In other words, the dimensions of discharge opening 68 are such as to permit the spout members to move freely therein. The upper end of discharge opening 68 is slightly wider than the lower end.

The sides of the inner portion of discharge opening 68 are formed by the left-hand vertical edge 69 of member 62 and the right-hand sloping edge 70 of member 64, while the forward or narrower portion of the discharge opening 68 is formed between the left-hand vertical edge 71 of a pivoted member 72, and the right-hand sloping edge 73 of a member 74 which is fixed upon the outer face of member 64. Member 72 is pivoted at 75 to the outer face of 72 for a purpose which will presently appear.

It was mentioned that the discharge opening 68 is wider at the top than at the bottom. The purpose of this is to facilitate the entrance of the spout members. To additionally encourage the spout members to enter this discharge opening, the leading edge of the inner portion of opening 68 is widened still farther. Such widening is produced by gently sloping the upper edge 76 of member 62 above vertical edge 69.

Thus, edge 76 is shown cut away a considerable distance to the right (Fig. 3) so that the spout members which are being moved along the upper curved edge of member 62 by the clockwise rotation of flange 48 and circular plate 49 pass onto the sloping edge 76 and roll downwardly to the discharge opening 68. They are, however, arrested by the engagement of the cap 10 of each of the spout members 5 with the upper horizontal edge of pivoted member 72. This edge, however, is joined with vertical edge 71 by a smoothly rounded corner so as to permit the spout members to more easily enter the discharge opening.

The left end of pivoted member 72 is urged downwardly by means of a tension coil spring 77 against a stop pin 78. At the right of pivot screw 75, member 72 has a tail portion at the end of which a roller 80 is pivoted and this roller is engaged by two diametrically placed cam members 81 which are fixed to the outer surface of rotating circular plate 49. Hence, twice during each revolution of this plate the left end of pivoted member 72 is raised out of engagement with stop pin 78 and then allowed to snap downwardly and strike the stop pin.

This movement raises the spout member whose cap is in engagement with the upper horizontal edge of member 72 and any other spouts above it and tends to break up any bridging-over of the spout members which may tend to form over the entrance to discharge opening 68. Also the motion of vertical edge 71 of member 72 in engagement with the caps of spout members within the discharge opening tends to urge these members downwardly, and the jarring effect caused by the striking stop pin 78 further tends to cause the feeding of the members downwardly toward the chute 17.

Since it is possible for a number of the spout members to simultaneously align themselves with the control members 50 and produce a considerable accumulation of the spout members in the lower space 59, provision is made for the spout members to collect at the left of discharge opening 68 and such a collection is shown in Fig. 3. In order to cause the spout members of this accumulation to feed into discharge opening 68 the continuously rotating drum or roller 42 is provided.

This drum rotates in a circular recess 82 formed in members 64 and 74. The drum closely fits this recess except for approximately its upper left-hand quadrant which is exposed to and engages the flanges 7 of the spout members. The face of roller 42 is flush with the face of member 74. Due to the clockwise rotation of drum 42 and its knurled or other friction-producing surface, it imparts rotation to the spout members so as to turn into line with the discharge opening 68 those whose handles 11 are not directed either upwardly or downwardly.

The periodic raising of the left end of pivoted member 72 also has the effect of rotating the spout members so that between the effects of rotating drum 42 and the operation of pivoted member 72, these spout members are fed successively into the discharge opening 68 with their connections or handles 11 facing in one or the other of the two directions, that is, upwardly or downwardly.

A cover member designated by numeral 62a (Fig. 2) is co-extensive with members 62 and 74 and is curved along its upper edge to conform to the surface of rotary plate 49. This cover member is preferably of Lucite, or other transparent material, so that the flow of the spout members into the discharge opening 68 may be observed. The cover member is held in position by means of two thumb screws 74a so that it may be readily removed. The left-hand thumb screw clamps the left portion of member 62a against the outer surface of member 74, whereas a spacing collar (Fig. 3) is provided on the right-hand thumb screw in order that the inner surface of the cover member may clear the pivoted member 72.

In order to prevent too large an accumulation of the spout members at the left rotating drum 42, an arcuate insert 83 is mounted in fixed position in the space between the rotating flange 58 and circular plate 59. Member 83 is stationary and is secured to the stationary band 60 by welding, or otherwise.

Feed chute 17 at its upper end has a short, vertical portion in direct alignment with the discharge opening 68 of the rearranging mechanism. The chute then bends to the left (Fig. 1) and descends at an angle of approximately 45° to its lowermost position where it bends to the horizontal and joins a pair of semi-circular guides 17a which are disposed in horizontal position immediately above the rotary mechanism 18 (Fig. 4) previously referred to.

Feed chute 17 is a substantially rigid structure providing a slot-like passageway for the spout members of substantially the same shape and dimensions as the lower end of discharge opening 68. This structure comprises two spaced parallel bars 84 (Fig. 2) which are spaced apart to form the passageway for the body portion of the spouts, and two strips 85 which are fixed to the upper surfaces of bars 84 and whose inner edges are more closely spaced than these bars so as to confine the spouts to the passageway and permit their caps 10 to project above. On the lower side of the passageway the spouts slide along a pair of strips 86 secured to the lower surfaces of bars 84.

These strips are spaced slightly from one another so as to permit the insertion of a prod, should the spout members become jammed. Although the spout members will ordinarily slide down the feed chute 17 by gravity, an electromagnetic vibrator 87 may be mounted on the feed chute to enhance their movement.

The rotary spout moving mechanism 18 (Figs. 4 and 7) comprises two superposed steel plates or discs, a lower disc 88 which is circular and an upper disc 89 which is provided in its edge with four spout-carrying notches 90. These discs are rigid members mounted close to one another with the surface of lower disc 88 level with the lower strips 86 of chute 17 so that the lowermost spout member in this chute will slide easily onto the surface of the disc. The upper surface of upper disc 89 is at about the height of the upper edge of the spout member flange 7 and the upper disc is thick enough so that the inner surface of each of the notches 90 will engage the spout member bead 12 on the body portion 6 (Fig. 7).

The inner half of each of the spout carrying notches 90 is semi-circular (Fig. 4) and dimensioned to receive the spout member bead. The edge of upper disc 89 is cut away as shown at 91 on a radius which extends from the leading edge of each notch 90 to a point a short distance from the trailing edge of the preceding notch 90. This leaves an arcuate space 92 along the edge of disc 89 between each of the notches 90 for the reception of the spout body portion 6 so that the foremost spout member at the bottom of chute 17 may advance into a position where its bead 12 rests against one of the semi-arcuate edges 91. The foremost spout member in chute 17 (Fig. 4) is in this position.

The trailing edge 93 of each of the notches 90 extends outwardly to the diameter of the lower disc 88. The spout members in feed chute 17 are kept in a "fluid" state by the forces of gravity and the vibrator 87. Hence, when each notch 90 comes into position opposite the end of chute 17 the foremost spout member flows or slides to the left slightly so that the side of bead 12 on its body 6 engages the bottom of the slot. The trailing edge 93 of the slot at substantially the same instant engages the side of the spout member and pushes or carries it forward, that is, in the counterclockwise direction of Fig. 4. The margin of each of the notches 90 is countersunk, as shown at 94 (Figs. 4 and 7) to accommodate the spout member flange 7.

In order to retain the spout members in the respective carrying notches 90, and to keep their handles 11 facing either forward or backward, a semi-circular guide strip 95 is mounted in close proximity to the upper disc 89 and these are spaced from one another appropriately to receive the lower portions of cap 10 of the spout members (Fig. 7). These strips are edgewise curved and extend from the end of feed chute 17 to spout member position, previously designated as a, which is almost diametrically opposite the end of feed chute 17.

Strips 95 are supported by the lower end of the feed chute and by a semi-circular bar 96 (Fig. 4) which is welded at about its center to a horizontal arm 97. This arm, in turn, is fixed to a post 98 which is supported by a bracket 99 mounted on frame 13. Strips 95 are supported from curved bar 96 by means of parts 100 which are radially arranged and are welded at their outer ends to the member 96.

The two discs 88, 89 are mounted at the upper end of a vertical shaft 101 and this shaft is rotated continuously with another vertical shaft 102 (Fig. 4) that carries the rotary head 103 which supports the plungers 20 and the pairs of cam pocket members 25, 26. These two shafts are interconnected and driven at the same rotative speed by mechanism not shown. The arrangement is such that as each of the spout-carrying notches 90 reaches spout position a one of the vertical reciprocating plungers 20 also reaches this spout position at the same instant.

The paths of the spout members and the paths of the plungers are tangent to one another at this point and the actuating mechanism for the plungers is such that when each plunger is in this position a it is reciprocated downwardly to its lowermost position and the chuck member 19 at its lower end frictionally engages the spout member and promptly lifts it out of the notch 90 so that this notch continues to rotate empty and to return to pick up another spout member from chute 17.

The construction of chuck member 19 is shown in Figs. 8–10. Its upper or body portion is a hollow cylinder which is received upon the lower end 104 of plunger 20 which is reduced in diameter for this purpose. A set-screw (not shown) holds the parts in assembled position.

The lower end of chuck 19 is formed to receive the cap 10 of the spout member and to fit over at least the upper portion of its flange 7, and to also accommodate the connection or handle 11 on each spout member. Thus, the chuck is provided with two wide recesses 106 at its lower end (Figs. 9 and 10) which extend upwardly a distance sufficient to receive the handles 11.

As the spouts descend the feed chute 17, the handles project forwardly or rearwardly and remain in the same angular position when they arrive at position a (Fig. 4). The handle of each spout member is received in one or the other of the recesses 106, depending on which way it faces. Recesses 106 are much wider than handles 11.

On each side of chuck 19 at its lower end, that is, extending between the two recesses 106, are arcuate projections and at their ends are formed arcuate surfaces 107 which are dimensioned to the maximum diameter of the flanges 7 of the spouts. At the centers of these arcuate edges 107 there are two spring-pressed gripper segments 105 also having arcuate surfaces 107a to frictionally engage the diametrically opposite edges of a spout flange 7 so as to pick up the spout member from the notch 90. These arcuate surfaces terminate upwardly in a shoulder which engages the marginal edges of flange 7.

The spring-pressed grippers 105 have sufficient radial movement to compensate for a considerable variation in diameter of the flanges 107 of different spout members. They are positioned in lateral slots 108 arranged at right angles to the recesses 106 and are held in position by the walls of these slots and by means of retainers 120 which are mounted on the opposite sides of the cylindrical body portions of chucks 19 (Figs. 8 and 10). Retainers 120 are held in position by means of cap screws 121. Grippers 105 are held in their slots 108 by lateral projections 122 at their upper ends which engage shoulders formed on the retainers 120. At the lower end of each retainer 120 there is a recess within which a compression spring 123 is placed which urges the gripper into engagement with the spout member.

A spout member which is about to be picked up by the chuck is centered with respect to the chuck by means of an internal conical surface 109 (Figs. 8 and 9) which terminates at its upper end in a cylindrical surface 110 which substantially fits the diameter of the cap 10. Thus, as the chuck member moves downwardly these surfaces engage the cap 10 and shift the cap on the surface of the lower disc 88 in such a way as to center the spout member precisely on the center line of plunger 20.

The reduced lower end 104 of plunger 20 extends downwardly to an internal shoulder 111 which is at the level of the top of cap 10 so that pressure is applied to this cap when the two arcuate surfaces are forced into engagement with the plunger 7, and also when the spout member is forced into the aperture in the can head at position C (Fig. 4), as previously described.

The construction of the rotary head 103 is shown more or less diagrammatically in Figs. 1 and 4. As shown it comprises a thick, rigid circular plate and it will be understood that this plate is fixed to and rotates with vertical shaft 102. The respective plungers 20 are mounted to slide in apertures in this plate and are each biased upwardly by means of a helical compression spring 112, the lower end of which engages the plate and the upper end a collar on the plunger.

At the upper end of housing 21 there is mounted a stationary face cam 113 and this cam is engaged by follower rollers 114 one adjacent the upper end of each plunger 20. The configuration of the lower face of this cam is such as to impart downward and upward movements to the respective plungers, as previously described.

The rotating head or plate 103 also mounts the relatively fixed and movable can pocket members 25, 26 which are arranged in cooperating pairs in vertical alignment with the four plungers, as previously described. The members 25 of each pair are fixed by means of screws 115, or otherwise, to the rotary head 103 adjacent its periphery, and suitably spaced from these respective pocket members 25 are vertical shafts 116.

The four pivoted or movable pocket members 26 are mounted on arms 117 which project horizontally from the lower ends of shafts 116, while at the upper ends of these respective shafts there are short actuating arms 118 each carrying a cam follower roller which cooperates with an internal face cam 119. The configuration of this cam is such as to cause the shafts 116 to pivot so as to open and close the respective pocket members 26 with respect to their fixed or stationary pocket members 25 at the proper times to admit the cans 1 from the endless conveyor 22 and to discharge them onto the rotary table 28, all as previously described.

My invention has been described in some detail in connection with one particular embodiment thereof and it will be understood that changes in the construction and arrangement of the various parts of this machine may be made and that the scope of the invention is set forth in the appended claims.

I claim:

1. In apparatus for applying spout members to the tops of containers having apertures therein, said members each having a projection at one side thereof, a supporting structure, means associated with said structure for supporting a helter-skelter mass of such members, mechanism for rearranging said spout members so that the tops of said spouts face in a given direction and so that said projections face in either of two directions, mechanism for receiving these spout members from said rearranging mechanism and for feeding the rearranged spouts in a continuous line including means for maintaining the projections thereof facing in the direction in which they have been rearranged and including means for turning said spouts to upright position, a tool constructed to pick up individual spouts in upright position with the projection thereof facing in either of said directions, mechanism for moving said spouts one at a time from said feeding mechanism into vertical alignment with and beneath said tool, mechanism for reciprocating said tool to cause it to pick up said spouts one at a time, mechanism for advancing said tool from said pick-up position, mechanism for feeding the containers into vertical alignment beneath said tool during such advance and mechanism for lowering said tool to cause it to force the spout member carried thereby into the aperture in the top of said container.

2. Apparatus for applying spout members to the tops of containers as set forth in claim 1 in which the mechanism for moving the spouts is arranged to carry the spouts in a circular path, and wherein the reciprocating tool for picking up the spout members also rotates in a circular path, these two paths being tangent to one another and the said tool picking up a spout member at the point of tangency of such paths.

3. Apparatus for applying spout members to the tops of containers as set forth in claim 2 in which the mechanism for moving the spouts comprises a pair of rotating discs fixed in superposed relation to one another, the margin of the lower disc serving as a support on which the spouts rest and the upper disc having spaced spout-receiving notches in its periphery for successively sweeping individual spouts from the feeding mechanism, mechanism for rotating said discs continuously in timed relation to said tool reciprocating mechanism so as to cause said discs successively to pick up individual spouts from said feeding mechanism and carry them beneath said respective reciprocating tools.

4. Apparatus for supplying spouts to the tops of containers as set forth in claim 1 in which the tool for picking up individual spout members comprises a body member having a pair of diametrically disposed arcuate axial extensions at its lower end, said extensions having a semi-circular opening between them to receive the top of a spout member and each of said arcuate projections having an arcuate flange arranged to frictionally engage the periphery of the spout member below the top thereof, said pair of arcuate extensions being spaced from one another to leave diametrically disposed recesses between them so that the projection on the spout member may be received in either of said recesses.

5. Apparatus for supplying spouts to the tops of containers as set forth in claim 4 wherein at least one of the arcuate projections of the tool for picking up the individual spout members is provided with a spring-pressed radially yielding segment which frictionally engages the periphery of the spout member.

6. In apparatus for applying spout members to containers, said members having each a projection at one side thereof, a supporting structure, means associated with said structure for supporting a helter-skelter mass of such members, mechanism for rearranging said spouts comprising a rotary receptacle having inner and outer vertical surfaces arranged to form an annular space between them, a circular row of control members fixed to said rotary receptacle and disposed between said surfaces and dividing said annular space into inner and outer portions, said control members being spaced from one another in said row and of a configuration to permit spouts to pass successively between them when the spout cap faces in a given direction, means for supplying said spout members en masse to said inner space portion on the lower side of said rotary receptacle, mechanism for rotating said receptacle about the axis of said annular space so as to cause the mass of spout members above said control members to tumble about and arranged themselves to pass individually between the control members into said outer space portion, means for supporting the spout members which have passed into said outer space portion, said means extending at least along the lower periphery of said rotary receptacle, said supporting means having therein a downwardly extending discharge passageway for said spout members, the rotation of said receptacle causing the spout members in said outer space portion to move toward the discharge passageway, and mechanism adjacent said passageway for bringing the projections on said members into alignment with said passageway to cause the spout members to be fed downwardly therethrough with their projections facing either downwardly or upwardly.

7. Apparatus for applying spout members to the tops of containers as set forth in claim 6 in which the supporting means for the spout members within said outer space portion is made to slope downwardly towards the entrance to said discharge passageway, and a finger is mounted for vertical upward and downward movement adjacent the front of said sloping surface to engage the forward portions of the spout members on said sloping surface, one end of said finger lying alongside of said discharge passageway, and mechanism for periodically actuating said finger to agitate the spout members and break up any tendency for them to bridge over the entrance of said discharge passageway.

8. Apparatus for applying spout members to the tops of containers as set forth in claim 6 in which a continuously rotating roller is mounted at one side of the entrance of the discharge passageway; the face of said roller engaging the spout members and rotating them as they move into the entrance of said passageway so as to align their projections with the passageway.

9. Apparatus for applying spout members to the tops of containers as set forth in claim 7 in which the said finger is arranged on one side of the discharge passageway; and wherein on the opposite side thereof there is provided a continuously rotating roller having its face engaging the spout members and serving to rotate them so as to align their projections with said passageway as they move into the entrance thereto.

References Cited in the file of this patent

UNITED STATES PATENTS

| 2,155,958 | Schmidt | Apr. 25, 1939 |
| 2,225,549 | Card | Dec. 17, 1940 |
| 2,604,692 | Broden | July 29, 1952 |
| 2,672,837 | Maher | Mar. 23, 1954 |
| 2,728,091 | Hoenk | Dec. 27, 1955 |
| 2,729,833 | Nielsen | Jan. 10, 1956 |

UNITED STATES PATENT OFFICE

CERTIFICATION OF CORRECTION

Patent No. 2,972,184                  February 21, 1961

Charles Andrew

It is hereby certified that error appears in the above numbered patent requiring correction and that the said Letters Patent should read as corrected below.

Column 1, line 19, strike out "the", second occurrence; column 11, line 35, for "arranged" read -- arrange --.

Signed and sealed this 4th day of July 1961.

(SEAL)
Attest:

ERNEST W. SWIDER
Attesting Officer

DAVID L. LADD
Commissioner of Patents